(12) United States Patent
Van Wassenhove et al.

(10) Patent No.: US 8,028,960 B2
(45) Date of Patent: Oct. 4, 2011

(54) FLIGHT DECK LAYOUT FOR AIRCRAFT

(75) Inventors: Yann Van Wassenhove, Toulouse (FR);
Laurent Saint-Marc, Toulouse (FR);
Louis Duroch, Toulouse (FR)

(73) Assignee: Airbus Operations SAS, Toulouse (FR)

(*) Notice: Subject to any disclaimer, the term of this patent is extended or adjusted under 35 U.S.C. 154(b) by 961 days.

(21) Appl. No.: 11/741,779

(22) Filed: Apr. 30, 2007

(65) Prior Publication Data

US 2010/0140397 A1    Jun. 10, 2010

(30) Foreign Application Priority Data

May 4, 2006    (FR) ...................................... 06 03961

(51) Int. Cl.
*B64C 13/04* (2006.01)
(52) U.S. Cl. ................... 244/221; 244/118.5; 244/118.6
(58) Field of Classification Search .............. 244/118.5, 244/118.6, 221
See application file for complete search history.

(56) References Cited

U.S. PATENT DOCUMENTS

| | | | | |
|---|---|---|---|---|
| 3,704,845 A | * | 12/1972 | Ord | ................................ 244/121 |
| 4,112,818 A | * | 9/1978 | Garehime, Jr. | ................ 89/41.05 |
| 4,625,731 A | * | 12/1986 | Quedens et al. | ................ 600/443 |
| 5,544,842 A | * | 8/1996 | Smith et al. | ..................... 244/1 R |
| 5,815,735 A | * | 9/1998 | Baker | ............................. 710/72 |
| 6,305,973 B1 | * | 10/2001 | Rosen | ........................... 439/534 |
| 6,915,985 B2 | * | 7/2005 | Arias | .......................... 244/118.5 |
| 6,972,947 B2 | * | 12/2005 | Duncan | ..................... 361/679.55 |
| 7,775,485 B2 | * | 8/2010 | Asai et al. | ................... 248/125.7 |

FOREIGN PATENT DOCUMENTS

FR    2 547 273    12/1984
WO    WO 95/08474    3/1995

OTHER PUBLICATIONS

Aerospace Engineering Online: Technology Update—Cockpit cohesion, Mar. 2000 (Included in Applicants NPL Prior Art).*
Airbus A400M, Avionics Magazene, Jul. 1, 2003 (Included in Applicants NPL Prior Art).*
Schäfer, Jürgen: "Airbus A400M", May 2, 2006, pp. 32-35.
Machine Design, "Airbus builds a Military Airlifter", Penton Media, Inc., Feb. 17, 2005, pp. 1-4.
Aerospace Engineering Online: Birch, Stuart, Technology Update "Cockpit Cohesion", Mar. 2000, pp. 1-2.
Adams, Charlotte: "Airbus A400M", Avionics Magazine, Jul. 1, 2003, pp. 1-7.

* cited by examiner

*Primary Examiner* — Tien Dinh
*Assistant Examiner* — Justin Benedik
(74) *Attorney, Agent, or Firm* — Oblon, Spivak, McClelland, Maier & Neustadt, L.L.P.

(57) ABSTRACT

An aircraft flight deck includes: first and second seats disposed side-by-side longitudinally in a flying direction of an aircraft, and separated by a central pedestal; control or display elements distributed ergonomically in the flight deck; and a third seat disposed longitudinally in the flying direction, located behind the first and second seats, and at a rear of the central pedestal. The central pedestal includes: a connecting device for the display elements, a control device dedicated to a third crew member and disposed at a side of the third seat; and display or control elements dedicated to tasks other than piloting, and visible and accessible from the three seats.

17 Claims, 4 Drawing Sheets

FLIGHT DECK LAYOUT FOR AIRCRAFT

BACKGROUND OF THE INVENTION

I. Field of the Invention

The present invention relates to a flight deck layout for an aircraft.

II. Description of Related Art

In civil aviation, recent aircraft flight decks are generally designed around a crew composed of two pilots seated side-by-side and facing the flying direction. Such a layout permits the pilot to have good inside and outside visibility, and the various instructions are disposed around the pilots so that they can easily access same.

French Patent 2547273 describes an ergonomic aircraft flight deck designed for two pilots. No provisions are made for a third crew member in the cockpit described in that prior art document.

Military aircraft have flight decks configured to accommodate three, four or five crew members. As for the cockpits of civil airplanes described above, they generally contain two seats for the pilots, disposed side-by-side longitudinally in the flying direction of the aircraft. The other crew members present in the cockpit are then provided with a space and with specific instruments dedicated to particular tasks.

The problem at the basis of the present invention is to provide an aircraft cockpit configured for variable crews of two or three crew members. It is then desired that the airplane can be operated just as well with two as with three crew members in the cockpit. For example, during a logistic flight, when only a pilot and a copilot are necessary to achieve the mission, the flight deck is occupied by only two crew members. During a tactical flight, when complex and numerous tasks must be performed, three crew members occupy the cockpit.

BRIEF SUMMARY OF THE INVENTION

It is therefore appropriate to integrate an additional crew member in efficient manner, since he has a role on board and therefore tasks to be accomplished. This third crew member must preferably be able to accomplish all the on-board tasks except for the piloting performed by the pilot and his copilot. It must also be ensured that the fact of providing a third crew member or the presence of that third crew member does not interfere with the pilot and copilot in their tasks. When the flight deck is occupied by only two crew members, it must not be impaired by the possibility that it offers of accommodating a third crew member.

To this end, the invention proposes an aircraft flight deck containing two seats disposed side-by-side longitudinally in the flying direction of the aircraft, and separated by a console known as the central pedestal, as well as control and/or display elements distributed ergonomically in the flight deck.

According to the invention, this flight deck also contains a third seat disposed longitudinally in the flying direction, behind the first two seats and at the rear of the central pedestal, and the central pedestal is provided on the one hand with connecting means for the display means and with control means dedicated to a third crew member and disposed at the side of the third seat, and on the other hand with display and/or control elements dedicated to tasks other than piloting and visible and accessible from the three seats.

Such a flight deck makes it possible to accomplish missions with two or three crew members. In missions with two crew members, the provided connecting means are not necessarily connected to display means and to control means. On the central pedestal, the two crew members then have access to diverse control and/or display elements for tasks other than piloting. In missions with three crew members, the connecting means are connected with display and control means which are then means dedicated to the third crew member. From his seat, he can then accomplish on-board tasks other than piloting. His position gives him good visibility both inside the flight deck and on the outside thereof, and access to controls that are also accessible to the two pilots.

In a flight deck according to the invention, a display screen can be disposed facing the third seat. Such a screen is preferably associated with a corresponding control panel. It may be a fixed screen, but preferably the central pedestal has a frame with mechanical guide means permitting the display screen to be guided from a disconnected position to a connected position, in which the connecting means provided to receive the screen cooperate with complementary connecting means of the screen, and locking means are provided to lock the screen in its connected position. These diverse means make it possible to have a screen that can be readily demounted and remounted. It is understood that other means permitting mounting/demounting of the screen can be provided here.

In a preferred alternative embodiment, the flight deck according to the invention is such that the central pedestal additionally contains a control panel integrating a keyboard accessible from the third seat.

To complete the equipment of the workstation of the third crew member, the third seat is advantageously furnished with connecting means for cabling and mechanical mounting of a box that integrates a pointing device, such as a cursor control device. Thus the pointing device is put in place during a mission with three crew members and is removed during missions with only two crew members.

One alternative embodiment of a flight deck according to the invention provides that this station has control panels disposed on the ceiling and/or along the side walls of the flight deck, out of reach of a crew member installed in one of the first two seats. Such panels are then dedicated to the third crew member. As an example, such panels can be communication means disposed on the ceiling above the third seat.

Among the control panels within reach of the three crew members in a flight deck according to the invention, there can be provided, on the central pedestal, at least one control panel for aircraft systems, a control panel for centralized display of alarms, at least one control panel associated with surveillance of the environment of the aircraft and a radio control panel.

The present invention also relates to an aircraft, characterized in that it is equipped with a flight deck such as described above.

BRIEF DESCRIPTION OF THE DRAWINGS

Details and advantages of the present invention will become more apparent from the description hereinafter, provided with reference to the attached schematic drawings, wherein.

DETAILED DESCRIPTION OF THE INVENTION

Figure 1:
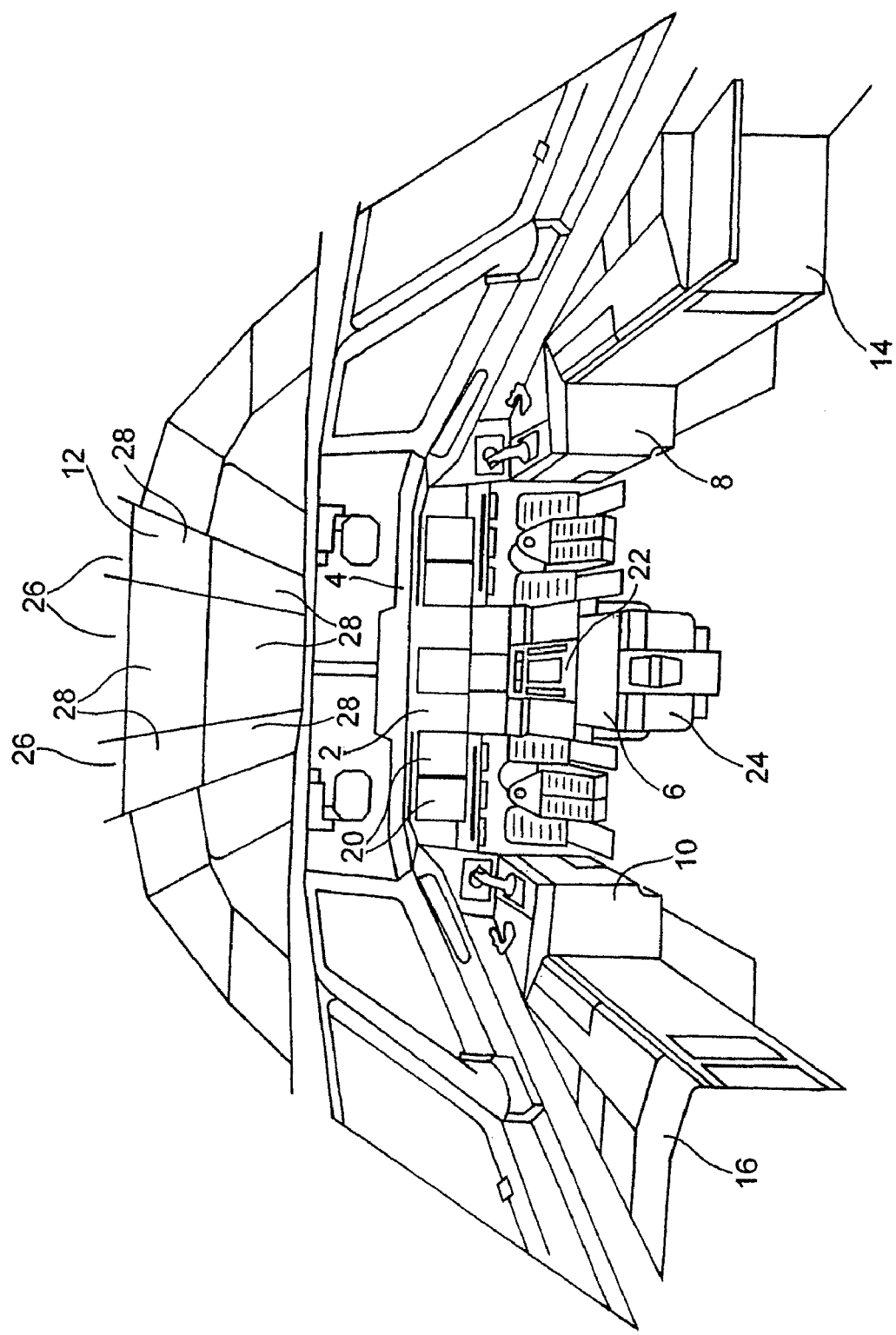
FIG. 1 represents a flight deck divided into a plurality of zones.
Figure 2:
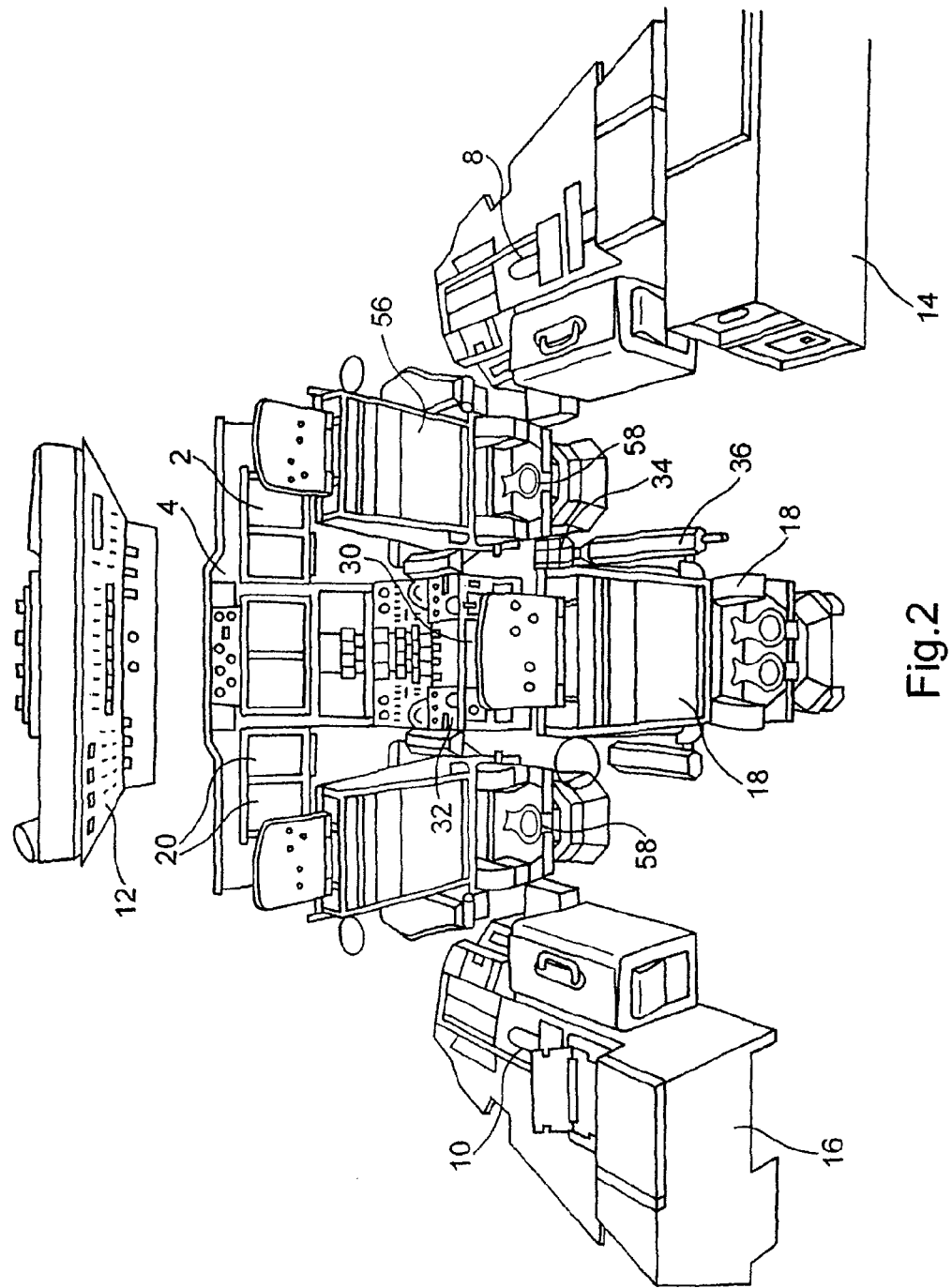
FIG. 2 is a perspective view of a flight deck according to the invention.

The description hereinafter relates to an aircraft flight deck layout in which the workstations of this flight deck can be reconfigured for two or three crew members, in a manner appropriate for the missions accomplished. The layout of the workstation for the third crew member corresponds to the different on-board roles that he may be required to perform.

An aircraft flight deck is a confined space whose layout is highly optimized for two pilots. In particular, all the zones accessible to them are used in order to position the numerous necessary monitoring devices and controls therein. The addition of a third crew member makes the layout more complex. This third crew member must not be too far away from the pilots, because he then cannot perform his role, or too close to them, so as not to interfere in their tasks.

The flight deck according to the invention is intended to be used as well with two crew members as with three crew members. The permanent presence of equipment items dedicated to the third crew member in the flight deck is not consistent with optimization (weight, cost, space requirement), and it adversely influences two-person missions. The solution described hereinafter makes it possible in original manner, to adapt to the mission need without adversely affecting the flight deck by dimensioning it for permanent use by three persons, since most missions are accomplished with only two crew members.

In a flight deck according to the invention, it is therefore appropriate to integrate efficiently a third crew member having an on-board role and therefore tasks to be accomplished. This third crew member must have good accessibility to the instruments and also good visibility to accomplish his tasks, all in a cockpit designed essentially for two pilots. In addition, the workstation of the third crew member, whether he is present or not, must not interfere with the tasks performed by the pilots, or adversely and uselessly affect the flight deck when it is being used only by two pilots.

For the flight deck layout described hereinafter, it is chosen to leave the choice of the role of the third crew member to the operators of the aircraft. Thus, with the exception of the tasks related to pure piloting, the third crew member preferably has the means to manage the diverse airplane systems, to communicate and to manage the flight and/or the mission.

The controls and instruments of the third crew member can be ranked in three categories. A first category concerns the equipment items that are always necessary and not related to the on-board role of the third person. These are equipment items that would be present even if the third crew member were simply an occupant of the flight deck. By way of non-limitative example, there are included in this category of equipment: a life jacket, an oxygen mask, a work surface, a cupholder, an ashtray, electric outlets, a reading light, a footrest, an air outlet for ventilation, an audio control panel and audio connection means.

In a second category there can be classified the equipment items dedicated to the third crew member by virtue of the roles that he may perform on board. These may be means that replicate those of the pilots but that must be specific to the third crew member, so that he can configure them and assign parameters to them according to his needs, without interfering with the other two crew members. Thus this category may include, for example: a screen, an on-screen pointing device, a control panel for screen displays and a keyboard.

Finally, the equipment items of the third category are equipment items that the third crew member shares with the pilots. They are unique equipment items in the flight deck, although the third crew member may also be led to use them in addition to the pilots. As non-limitative examples, there can be cited here, as equipment of this third category: the control panels of systems, the control panels associated with a mission (example: dropping operations), a control panel for centralized display of alarms, control panels related to surveillance of the environment of the aircraft, a radio control panel.

For the design of the flight deck, it is divided into functional zones as illustrated in FIG. 1. For each of these zones, the levels of accessibility and visibility offered for each of the three potential crew members are determined. This yields a map of the flight deck, exhibiting the level of accessibility and visibility for each of the crew members for each zone.

In the flight deck of FIG. 1, there are shown an instrument panel 2, a dash 4, a central pedestal 6, a right lateral console 8, a left lateral console 10, a ceiling panel 12, a right rear console 14 and a left rear console 16. FIG. 1 shows how all these parts of the flight deck are divided into functional zones.

In this flight deck, the third crew member is placed in such a way as to offer him considerable accessibility to the instrumented surfaces of the flight deck, such as ceiling panel 12, central pedestal 6, etc.

In a flight deck according to the invention, the third crew member occupies at the rear of central pedestal 6. Just as the other two crew members, he is installed longitudinally in the flying direction of the aircraft.

Figure 3:
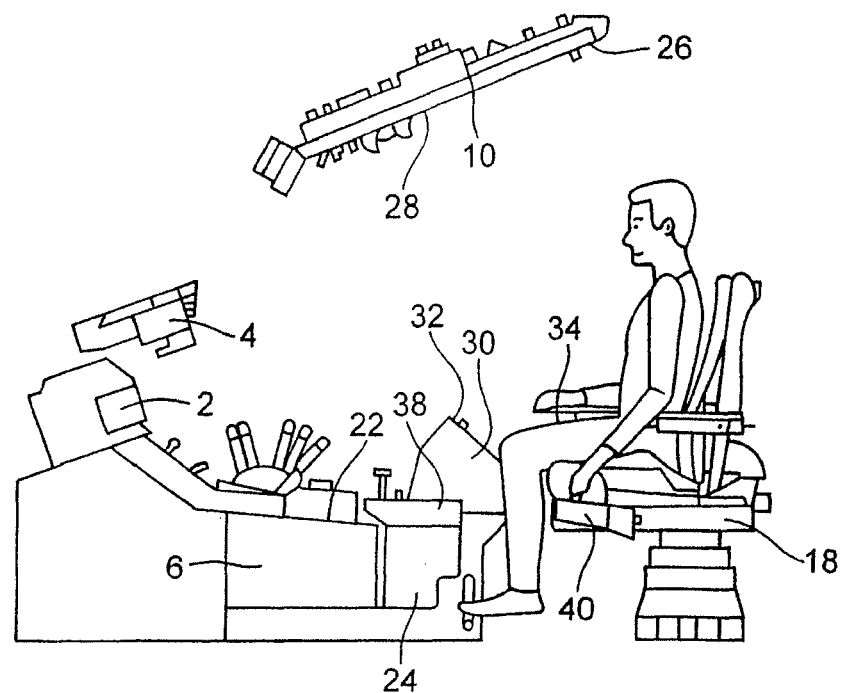
FIG. 3 is a side view showing a third crew member installed in the flight deck of FIG. 2.

FIG. 3 therefore shows a third crew member installed on his seat 18 at the rear of central pedestal 6. The longitudinal position and the adjustment range of seat 18 of the third crew member are determined by the comfort at the level of the legs in seated position relative to central pedestal 6. Allowance is made here for the seated position of a crew member of small stature and of a crew member of large stature. The vertical position of the third crew member is determined in such a way as to permit contact of the feet of the third crew member with the floor, access to ceiling panel 12 for this third crew member and visibility to the outside of the aircraft enabling the third crew member to assess the situation in a manner conforming with that of the pilots (or in other words the other two crew members).

The chosen position, or in other words longitudinally in the flying direction, favors communication between the crew members as well as sharing of tasks, and it optimizes the number of commonly used equipment items. The third crew member therefore has accessibility and visibility that did not exist in prior art aircraft, in which the flight deck was equipped with one seat for a mere observer.

The different functional zones defined in the foregoing are each analyzed from an ergonomic viewpoint in order to determine their accessibility and their visibility for the three crew members. It is recalled here that the first two crew members, the pilot and copilot, are positioned side-by-side longitudinally in the flying direction of the aircraft, facing instrument panel 2 and separated by central pedestal 6.

As an example, it is possible to determine various levels of accessibility. For a given crew member, it can be considered that a functional zone is immediately accessible, easily accessible, moderately accessible or inaccessible. Depending on the circumstances, the functional zone under consideration for this crew member will be respectively accessible instinctively by the crew member, accessible without requiring particular effort of the crew member, accessible with moderate physical effort (such as extending the body) or not accessible at all.

Similarly, a visibility level for each of the crew members can be defined for each functional zone. The visibility of the functional zone under consideration for the crew member may be immediate. A simple eye movement then makes it possible to access this functional zone visually. A functional zone may have good visibility for a crew member if the crew member does not need any particular effort in his working posture to see the functional zone under consideration. Typically a simple eye movement of the crew member permits visual access to the functional zone under consideration. A functional zone will have moderate visibility for a crew member if he has to exert moderate effort to see it. Finally, a functional zone is not visible for a crew member when he cannot see that functional zone from his workstation.

As an example, there can be considered the two panels 20 forming the functional zone referred to as left instrument panel. For this first crew member located on the left in the flight deck, these panels 20 have good accessibility and immediate visibility. For the second crew member, positioned on the right in the flight deck, these panels 20 are not accessible and have moderate visibility. Finally, for the third crew member positioned to the rear of the central pedestal, these panels 20 are also inaccessible and offer moderate visibility.

In another example, for functional zone 22 disposed in the middle of central pedestal 6, the first two crew members have immediate accessibility to that zone and good visibility thereof, while the third crew member has good accessibility to and good visibility of this functional zone 22.

In parallel with this analysis of the functional zones of the aircraft, there is undertaken a detailed analysis of the tasks of the crew, in order to determine the necessary accessibility level for each control and the necessary visibility level for each display screen.

These two analyses conducted in parallel therefore lead to certain modifications compared with a civil flight deck for two pilots. For example, a radio management panel comprising dedicated controls for each crew member is usually situated on the central pedestal with good accessibility and good visibility for both pilots. In the framework of a military mission, the workload associated with radio communications is greater, and this radio management panel requires optimal access and visibility for each pilot. This radio management panel is then repositioned in the central part of dash 4, for example. In this way, free space is created in central pedestal 6, so that an equipment item necessitating good accessibility and good visibility for the three crew members can be disposed at this position.

In this way functional zones dedicated to the three crew members and zones common to the pilots and the third crew member are located in the flight deck.

The functional zones dedicated to the third crew member are, for example: functional zone 24, disposed at the extreme rear of central pedestal 6, control panels 26, disposed at the extreme rear of ceiling panel 12, right and left rear consoles 14 and 16 and, of course, seat 18 of the third crew member.

The zones common to the pilots and to the third crew member are located substantially in the middle of ceiling panel 12 as well as on central pedestal 6, except for the extreme rear part of this central pedestal 6, which is inaccessible and not visible for the two pilots. In this flight deck there are therefore located, for example, control panels for management of systems disposed in the middle of ceiling panel 12 in functional zones 28. The control panels related to aircraft missions are placed in multi-purpose zones, which are accessible and visible for the three crew members with substantially the same level of visibility and accessibility. These can be, for example, control panels concerning the auto-protection system, concerning the radar, a control panel of the surveillance system, that for controls for dropping operations, and that permitting the different system pages to be displayed on the screens.

In the preferred embodiment of a flight deck represented in FIGS. 2 to 5, a screen 30 is placed in functional zone 24 situated at the rear extremity of central pedestal 6. As illustrated in FIG. 3, this screen 30 is oriented and positioned according to several criteria. Firstly, this screen is disposed in such a way as to permit good visibility thereof in all positions of the third crew member on his seat 18, regardless of the stature of this third crew member. Thus the distance of screen 30 from the eyes of the third crew member is such that symbols and texts appearing on this screen can be easily read. This screen must not encroach on the visibility that the third crew member has of the various panels disposed on central pedestal 6.

A control panel 32 is associated with this screen 30. For example, it is disposed above screen 30. It permits the third crew member to select the different displays presented on the screen. By virtue of its position, the controls can be effected with minimal movement relative to the nominal working position of the third crew member.

Screen 30 is mounted in functional zone 24 disposed at the rear extremity of central pedestal 6 in such a way that it can be easily demounted and remounted. This functional zone 24 is therefore equipped with all the connections necessary for connecting screen 30. Quick-connect means are chosen here. As an example, the rack principle is used. Functional zone 24 is then equipped with a metal structure, a frame, with which the screen can be supported and guided while it is being positioned and removed. During positioning of screen 30, the guide means make it possible to bring the connecting means provided on central pedestal 6 and the complementary connecting means provided on screen 30 into coinciding relationship. The electrical connections are therefore made automatically while screen 30 is being mechanically positioned. Such a mounting principle makes it possible to avoid any manual connection. Likewise it no longer is necessary to provide cable slack or any free part.

The metal structure receiving screen 30 is preferably integrated into functional zone 24 situated at the rear extremity of central pedestal 6, or in other words in a zone dedicated to the third crew member. When screen 30 is not mounted, its housing is closed, for example by a shutter plate, advantageously using the fixations provided for fixation of screen 30 on central pedestal 6. This shutter plate can be used as a work surface when screen 30 is not installed. In contrast, when screen 30 is installed, a retractable work surface 34 is provided at the extremity of right arm rest 36 of seat 18 provided for the third crew member.

This retractable work surface 34 is preferably mounted on a pivot link that allows it to be oriented. For safety reasons, it is also preferable to provide a ball-bearing spring system permitting this work surface to move aside automatically under the effect of an excessively large downward vertical force. In this way deterioration of this equipment during daily use can be avoided.

Control panel 32 of the screen displays is mounted in customary manner by quarter-turn fixations above screen 30. An electrical connector is provided for connection of this control panel. At the level of central pedestal 6, in functional zone 24 at the rear extremity of this pedestal, there can be provided a dummy receptacle (not illustrated) intended to receive the connector of control panel 32 when this is demounted, in order to prevent any mobility of this connector. It is noted here that control panel 32 and screen 30 are not used without one another.

Beside screen 30, in the embodiment of the flight deck illustrated in the drawings, there is disposed a keyboard 38 beside screen 30. This keyboard 38 is mounted in customary manner by quarter-turn fixations. A connector is also provided for electrical connection of keyboard 38. When the panel containing keyboard 38 is demounted, the corresponding connector is attached to a dummy receptacle in the interior of a housing provided at the rear extremity of central pedestal 6, in order to prevent any mobility. The housing intended to receive keyboard 38 when the corresponding panel is not mounted can be closed by a shutter plate (not illustrated).

Figure 5:
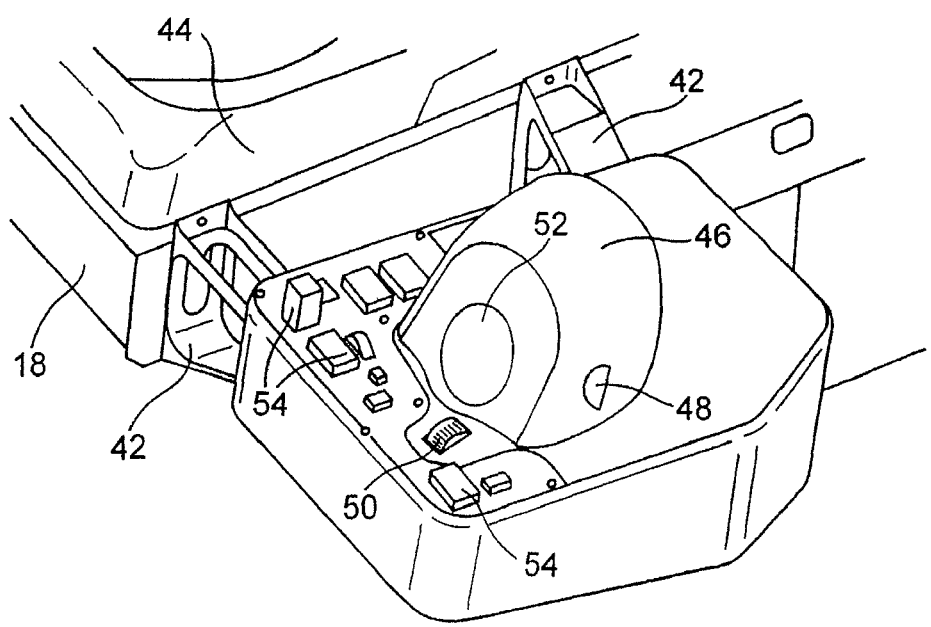
FIG. 5 shows, in greater detail, a pointing device with which the seat of the third crew member is equipped.
Figure 4:
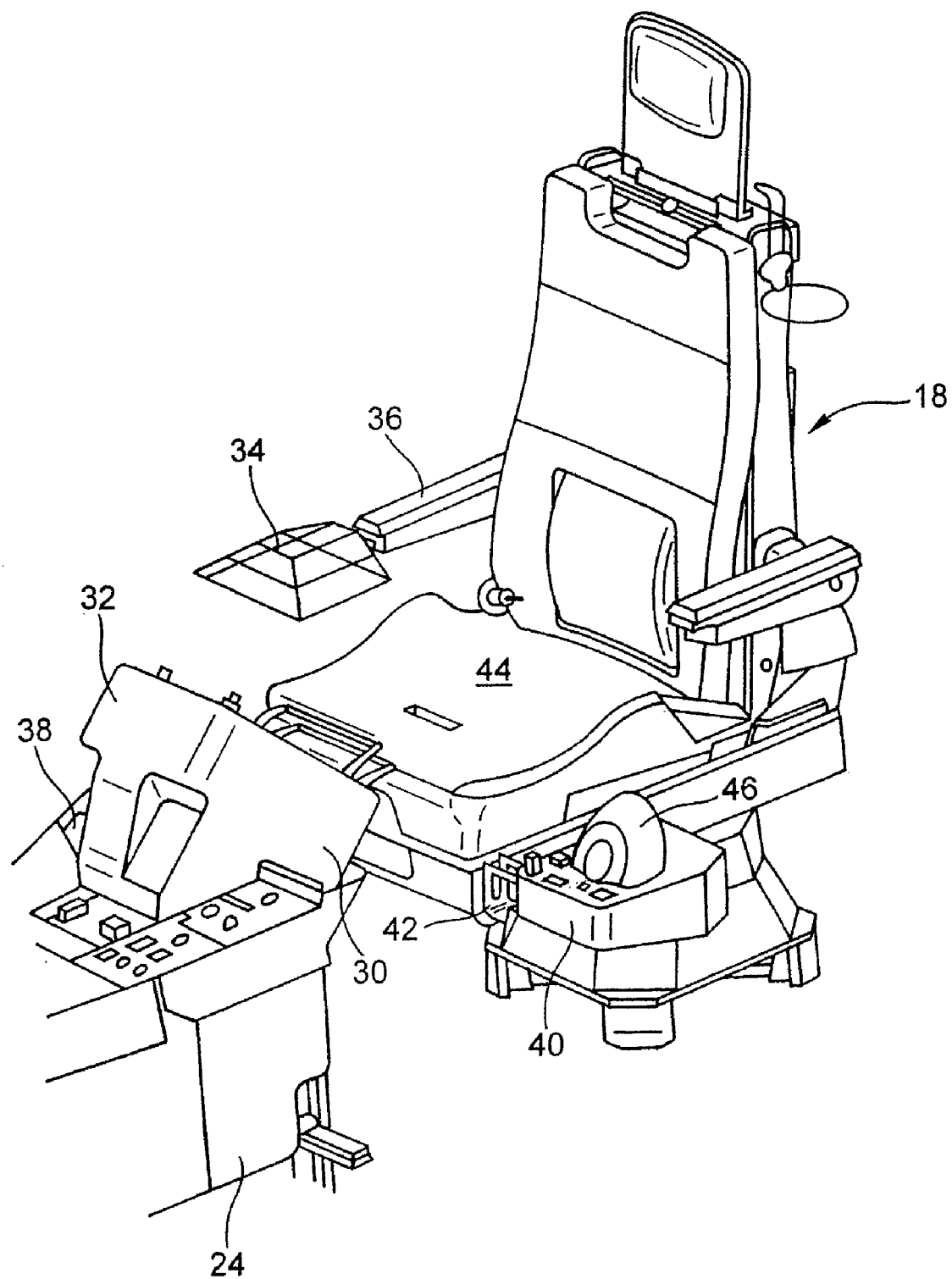
FIG. 4 shows the seat and the console of the third crew member.

In original manner, the present invention proposes, in a preferred embodiment, equipping the third crew member with a pointing device 40, which is fixed to seat 18 intended for the third crew member. This device, also known by the name CCD (for cursor control device, or dispositif de commande de curseur in French), is connected to seat 18 by two fittings 42, as illustrated in FIG. 5. Since seat 18 is equipped on its right side with retractable work surface 34, pointing device 40 is disposed on the left of seat 18. As can be seen, in the described preferred embodiment, pointing device 40 is disposed at the level of seat cushion 44 of seat 18.

Fittings 42 ensure that the attachment to seat 18 is sufficiently rigid to prevent any deterioration when an excessive load (support, foot, etc.) is exerted. Fittings 42 are made in one piece with the pointing device. Holes (not illustrated) are provided in the chassis of seat 18, at the level of seat cushion 44, to permit rapid mounting/demounting of pointing device 40 by means of fixation. Seat 18 is also cabled to permit connection of pointing device 40. The connecting cables are installed permanently in seat 18 and are disposed in such a way that they do not interfere with the overall use of this seat. They then pass through the floor of the flight deck to rejoin the other systems.

FIG. 5 shows various elements of pointing device 40. Thus this device is provided with a palm rest 46, a validation button 48, a selection wheel 50 and a pointer track ball 52. There are also shown keys 54 intended, for example, to permit direct access to the most common functions.

As follows from the foregoing description, these various equipment items dedicated to the third crew member can all be mounted and demounted rapidly. In this way there can be assembled an equipment kit comprising screen 30, its control panel 32, keyboard 38 and pointing device 40. When a mission requiring three crew members is planned, this kit is then installed in the flight deck as indicated hereinabove. At the end of the mission, the consecutive elements of this kit are removed until the next mission necessitating the presence of a third crew member. The kit assembled in this way corresponds to equipment items of the second category defined above. The elements of the two other categories remain permanently in the flight deck. In fact, these other equipment items are not associated with the role of the third crew member.

The fact that connectors and cabling of the various equipment items dedicated to the third crew member are provided permanently makes it possible to achieve rapid mounting and demounting of all of these equipment items.

Among the equipment items of the first category mentioned above, the life jacket of the third crew member, for example, can be housed in a back 56 of a seat intended for another crew member. An ashtray and/or a cup holder 58 can also be provided at the rear of each seat of the other two crew members. An oxygen mask as well as audio, electrical and oxygen connections can be provided, for example at the level of a left or right rear console.

The flight deck described here is therefore a flight deck for two crew members wherein controls and instruments have been relocated in order to create free space and permit the installation of a third crew member capable of working efficiently. The controls and instruments of this flight deck are positioned according to objective criteria directly related to the tasks of the crew members, whether the flight deck is occupied by two or even by three crew members.

The flight deck proposed in this way makes it possible to accommodate a third crew member under the same conditions of comfort as those of the pilots. This third crew member benefits from a multi-purpose working environment adapted to different types of tasks other than piloting, especially by virtue of judicious positioning of equipment items and man-machine interfaces and also by virtue of equipment items and man-machine interfaces dedicated to him.

The flight deck described hereinabove makes it possible to reduce very substantially the impact of this flexibility on the configuration of the flight deck for two crew members.

The position of the third crew member in the flight deck makes it possible to favor natural communication among the crew members through physical proximity, without nevertheless causing interference among these three crew members.

Finally, the described flight deck can be converted rapidly from a configuration for two crew members to one for three crew members.

Preferably, the elements dedicated to the third crew member, screen 30, control panel 32, keyboard 38 and pointing device 40 function in a manner similar to that of similar equipment items used by the pilot and copilot. In addition, the majority of the equipment items of the central pedestal are common to the pilots and to the third crew member. In this way, a pilot can take the place of the third crew member. In fact, the functioning of the equipment items intended for the third crew member is then the same as that of the equipment items used by the pilots. This means that no additional training is needed for the pilot taking the place of the third crew member.

The present invention is not limited to the preferred embodiment of a flight deck described hereinabove by way of non-limitative example. It also relates to all alternative embodiments within the grasp of the person skilled in the art within the scope of the claims hereinafter.

The invention claimed is:

1. An aircraft flight deck, comprising:
a first seat and a second seat disposed side-by-side longitudinally in a flying direction of an aircraft, and separated by a central pedestal;
control or display elements distributed ergonomically in the flight deck; and
a third seat disposed longitudinally in the flying direction and located behind the first and second seats, at a rear of the central pedestal,
wherein the central pedestal includes
a first connecting means for connecting a display screen,
a control means dedicated to a third crew member and disposed at a side of the third seat,
central pedestal display or control elements dedicated to tasks other than piloting, and visible and accessible from the three seats, and
a frame including a mechanical guide means for guiding the display screen from a disconnected position, in which the display screen is completely detached from the central pedestal, to a connected position, in which the display screen is secured to the central pedestal, the first connecting means receiving the display screen and cooperating with a complementary connecting means of the display screen, and wherein the third seat includes a pointing device attached to a side of the third seat.

2. The flight deck according to claim 1, the display screen faces the third seat.

3. The flight deck according to claim 2, wherein a control panel is associated with the display screen.

4. The flight deck according to claim 2, wherein the central pedestal further comprises a locking means for locking the screen in the connected position.

5. The flight deck according to claim 1, wherein the central pedestal further comprises a control panel configured to connect to a keyboard that is accessible from the third seat.

6. The flight deck according to claim 5, wherein the keyboard, the control panel, and the display screen are removable in order to convert the flight deck for use by only two crew members.

7. The flight deck according to claim 1, wherein the third seat comprises a second connecting means for cabling and a box integrating the pointing device.

8. The flight deck according to claim 1, further comprising control panels disposed on at least one of a ceiling and side walls of the flight deck, and out of reach of a crew member seated in one of the first and second seats.

9. The flight deck according to claim 1, further comprising a communication means disposed on a portion of a ceiling above the third seat.

10. The flight deck according to claim 1, wherein the central pedestal further comprises, within reach of a crew member seated in any one of the three seats:

at least one control panel for aircraft systems, a control panel for a centralized display of alarms, at least one control panel associated with a surveillance of an environment of the aircraft, and a radio control panel.

11. An aircraft, comprising the flight deck according to claim 1.

12. The flight deck according to claim 1, wherein the third seat includes a retractable work surface attached to an arm rest of the third seat.

13. The flight deck according to claim 1, wherein the third seat includes a seat cushion that is substantially parallel with a floor of the flight deck, and wherein the pointing device is disposed at a level of the seat cushion of the third seat.

14. The flight deck according to claim 1, wherein the pointing device is attached to the side of the third seat via two fittings which are integral with the pointing device.

15. The flight deck according to claim 1, wherein the pointing device is disposed on a side of the third seat that is opposite a side including a retractable work surface.

16. The flight deck according to claim 1, wherein the pointing device includes a palm rest, a selection wheel, and a pointer track ball.

17. The flight deck according to claim 1, wherein the third seat includes cabling installed therein, which does not interfere with use of the third seat, and wherein the cabling is configured to connect the pointing device to the control or display elements.

* * * * *